(12) United States Patent
Pettersson

(10) Patent No.: US 7,055,464 B2
(45) Date of Patent: Jun. 6, 2006

(54) OPERATIONALLY CODED ANIMAL COLLAR

(76) Inventor: Yvette Pettersson, 810 Bayberry Dr., Corona, CA (US) 92882

( * ) Notice: Subject to any disclaimer, the term of this patent is extended or adjusted under 35 U.S.C. 154(b) by 0 days.

(21) Appl. No.: 10/897,755

(22) Filed: Jul. 23, 2004

(65) Prior Publication Data
US 2006/0032463 A1 Feb. 16, 2006

(51) Int. Cl.
*A62B 35/00* (2006.01)

(52) U.S. Cl. .................................... 119/864

(58) Field of Classification Search ............... 119/856, 119/857, 864, 863, 792, 795, 769; 54/19.1, 54/19.3; D30/152, 199
See application file for complete search history.

(56) References Cited

U.S. PATENT DOCUMENTS

| | | | |
|---|---|---|---|
| 838,093 A * | 12/1906 | Emmons | 138/89 |
| 3,817,218 A | 6/1974 | Bongiovanni | |
| 3,872,833 A | 3/1975 | Herbert | |
| 3,995,598 A * | 12/1976 | Gardner et al. | 119/864 |
| 4,022,161 A | 5/1977 | Halperin | |
| 4,584,967 A * | 4/1986 | Taplin | 119/793 |
| 4,924,815 A | 5/1990 | Halla | |
| 5,003,930 A | 4/1991 | Shields | |
| 5,467,743 A | 11/1995 | Doose | |
| 5,497,733 A | 3/1996 | Hull et al. | |
| 5,676,093 A | 10/1997 | Sporn | |
| 5,711,255 A | 1/1998 | Rudolph | |
| 5,911,200 A | 6/1999 | Clark | |
| 2002/0112676 A1 | 8/2002 | Jacobs | |

* cited by examiner

*Primary Examiner*—T. Nguyen

(57) ABSTRACT

A coded animal training collar that facilitates proper collar orientation to prevent collar locking that includes an elongated material with an connector attached to one end of the elongated material. The elongated material including a first surface, and a second opposing surface, the first surface being visually distinguishable from the second surface, the connector being suitable for permitting the elongated flexible material to pass therethrough allowing formation of a loop, which loop can be placed about an animal's neck in the proper orientation according to contiguity in surface appearance in those upwardly-facing portions of the collar that are visible to the user.

4 Claims, 2 Drawing Sheets

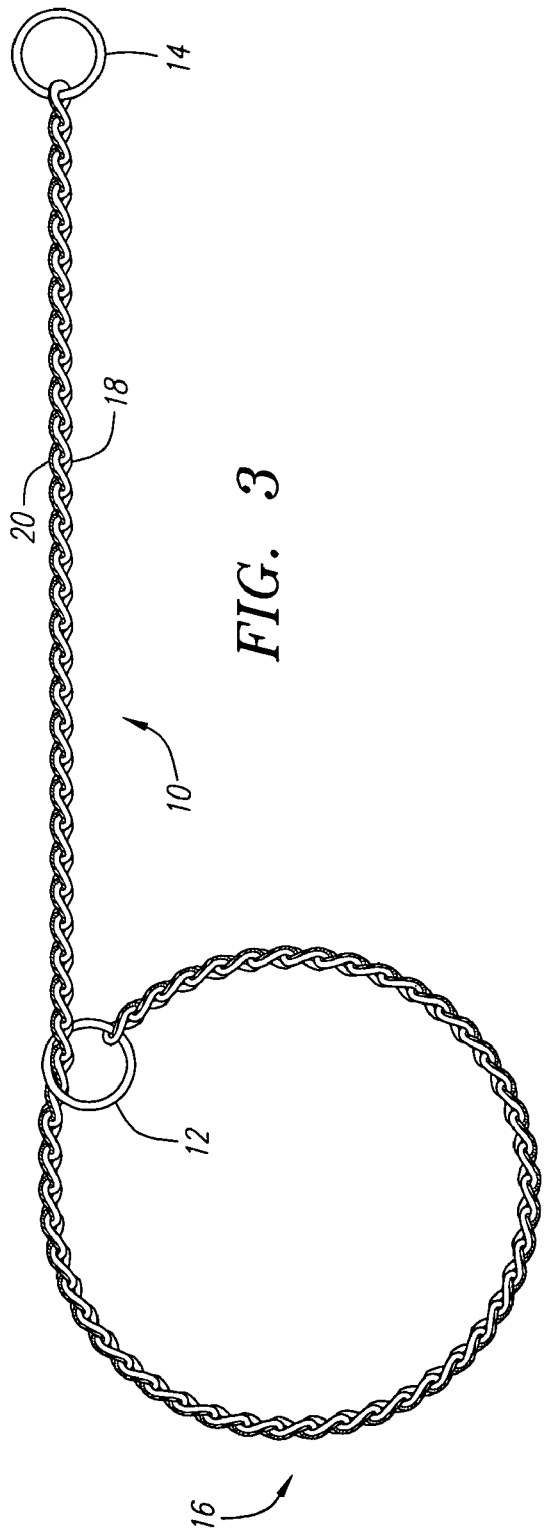
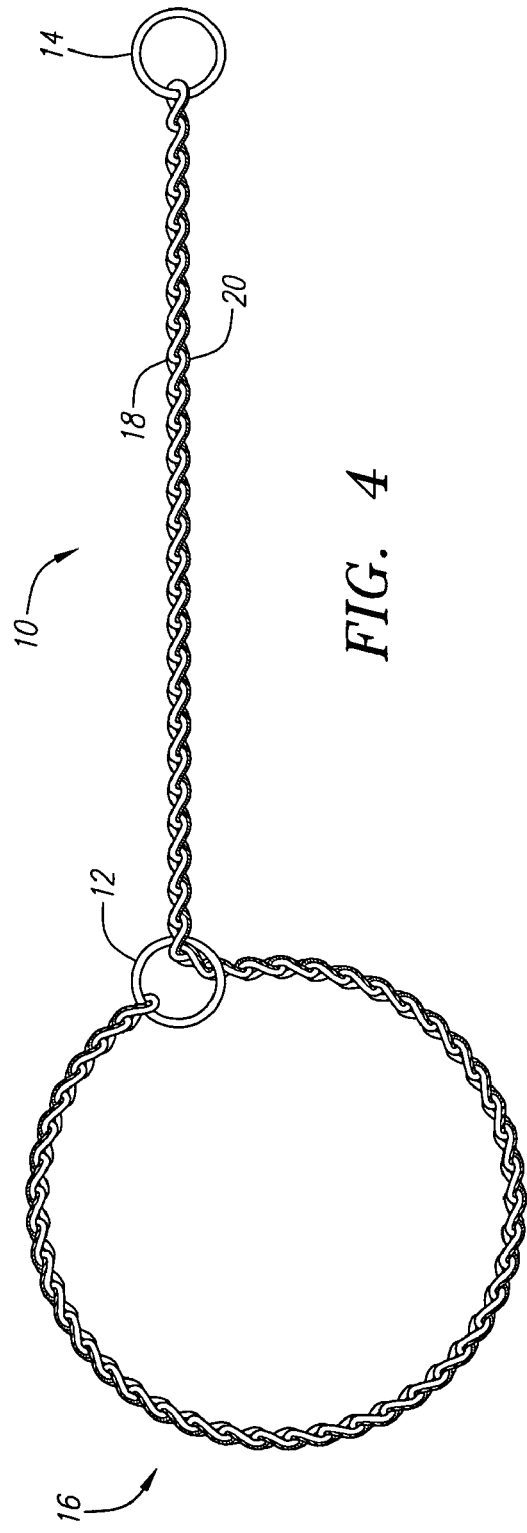

OPERATIONALLY CODED ANIMAL COLLAR

BACKGROUND OF THE INVENTION

The field of the present invention is animal collars, specifically, an improved, animal training collar that is marked for proper and correct orientation and operation.

Adjustable animal collar devices or "choke" collars are well known in the art. In particular, collars that use chains or other elongated material with a connector at each end, in which the material is passed through one connector to form a large loop, thus permitting variable collar tension, have been described previously. Examples of such collars are found in patents issued to Sockett (British Patent No. 838,093), Bongiovanni (U.S. Pat. No. 3,817,218), Gardner et al. (U.S. Pat. No. 3,995,598), Shields (U.S. Pat. No. 5,003,930), Doose (U.S. Pat. No. 5,467,743), and Hull et al. (U.S. Pat. No. 5,497,733).

These collars are typically used in training animals to follow the command of the trainer. Such training collars are usually placed about an animal's neck and attached to a leash. The tension of the collar about the animal's neck can then be quickly varied by pulling the leash or loosening the tension on the leash. In this way, the trainer can give learning cues to the animal by temporarily pulling the leash to increase the tension of the collar around the animal's neck to create a momentary, unpleasant choking sensation. Training collars are designed to permit increased tightening of the collar with increasing tension on the leash. Importantly, however, to be a safe and effective training tool, the tightness of the collar about the animal's neck should quickly decrease upon release of the tension from the leash. Failure of the collar to consistently and quickly release following release of leash tension is undesirable for numerous reasons, including ineffectiveness in training, inefficient collar operation, and most critically, care and safety of the animal.

Training collars are commonly composed of elongated chains or bands having a circular or enclosed connector at each end. The chain or band is passed through one of the connectors, the "cinch" connector, and a leash is attached to the other connector, the "leash" connector. The large loop formed by passing the chain or band through the cinch connector is placed around the animal's neck. In order for the collar to function properly, the collar must be oriented about the animal's neck such that the non-sliding portion of the chain or band that is directly attached to the cinch connector hangs essentially down from the cinch connector. If, on the other hand, the loop is oriented such that the cinch connector hangs essentially down from the non-sliding portion of the chain or band, then, upon release of leash tension, the cinch connector does not readily move toward the leash connector. Instead, the cinch connector tends to remain in position and does not move or otherwise allow ease of release of collar tension. This improper orientation results in the collar remaining locked in place while tightened about the animal's neck. The animal owner must then manually move the cinch connector to release tension each time the leash is pulled, or else risk injury to the animal.

The difference between proper and improper application and orientation of training collars, such as choke chains, is difficult to detect. When viewed from above by the trainer, the chain or collar looks very similar, if not identical, regardless of whether the collar is properly or improperly oriented. Conventional training collars do not allow for easy detection or determination that the collar is properly oriented around the animals neck. Shields (referenced above) teaches a collar composed of a polymeric material that tends to cause the collar to more readily revert back to its larger circumference following release of leash tension. Gardner et al. (referenced above) teaches a collar with a link that breaks upon a pre-determined, threshold collar tension. However, the prior art is devoid of references that teach a collar with physical features facilitating proper collar orientation, or which otherwise permit easy detection of improper orientation, thus reducing collar locking. Nor does the prior art teach a method for accomplishing proper collar orientation using a coded training collar.

SUMMARY OF THE PRESENT INVENTION

In view of the foregoing disadvantages and problems inherent in the devices and teachings disclosed by the prior art, the present invention is an improved training collar that is coded to permit the collar user to quickly and correctly orient the collar about the animal's neck for proper functioning of the collar, and to permit ease of detection when the collar has been improperly applied to the animal. The present invention is also a method for accomplishing proper collar orientation using a coded training collar.

The present invention accomplishes the foregoing using an elongated chain or band having a connector attached at each end of the band. The band is constructed such that it has two surfaces, one that faces essentially outwardly, and another that faces essentially inwardly when the band is placed in a loop about the animal's neck. The visual appearance of the surfaces are differentiated, such that the user can easily tell which side is facing essentially outwardly. This can be accomplished using any number of differentiating techniques, such as the use of different colors, different textures, different surface or band materials, or any number of other techniques or combinations of the foregoing. Other ways to differentiate the two surfaces will be readily apparent to those skilled in the art. Since the two surfaces are so-differentiated, the user can readily determine whether the collar has been placed about the animal's neck in the proper orientation, as described in greater detail below. This is because the collar can be placed in such a way that the non-slideable portion of the band hangs down from the cinch connector, only if all collar surfaces visible to the user (i.e. all visible surfaces that are essentially upwardly-facing), actually match, or are otherwise contiguous in color or appearance. If all surfaces visible to the user do not match or are not contiguous in color or appearance, then the user can readily detect that the collar is not properly oriented about the animal's neck, and the user can thus adjust the collar to the correct orientation.

It is therefore one object and advantage of the present invention that the user is able to easily discern whether the collar has been properly placed about the animal's neck, and to easily detect improper placement. It is another object and advantage of the present invention that the collar operate to tighten and release about the animal's neck in an efficient manner without further adjustment by the user. It is yet another object and advantage of the present invention that the collar is oriented such that the animal is not injured due to collar locking. It is yet another object and advantage of the present invention that training of the animal is facilitated due to proper collar functioning and operation.

The foregoing objects and advantages are not meant to be an exhaustive summary, inasmuch as further objects and advantages of this invention will be readily apparent to those skilled in the art from the following detailed description, taken independently or in conjunction with the annexed sheets of drawings, in which an embodiment of the invention is described and shown. The following detailed description and annexed drawings are provided only for purposes of illustration of one possible embodiment of the present invention, and not for purposes of limitation of the appended claims.

BRIEF DESCRIPTION OF THE DRAWINGS

The following detailed description of the invention can be better understood with reference to the accompanying drawings, wherein:

FIG. 3 is a side view showing the collar in the proper orientation forming a large loop, with the chain hanging down from the cinch connector, and with all upwardly-facing surfaces having the same appearance; and FIG. 4 is a side view showing the collar in the improper orientation forming a large loop, with the cinch connector hanging down from the non-slideable portion of the chain, and with the upwardly-facing surface on the loop having an appearance that is different from the upwardly-facing portion of the chain that stretches between the cinch connector and the leash connector.

In the drawings, similar reference characters denote similar elements throughout the several views, as well as within the detailed description below.

DETAILED DESCRIPTION OF A PREFERRED EMBODIMENT

Referring to FIGS. 1–4, an improved training collar is shown in accordance with the present invention, comprising the main body 10, and connectors, 12 and 14 attached at opposing ends of the main body 10.

The main body 10 of the collar is comprised of any type of flexible material that is elongated forming a band or chain, such that it can be placed around an animal's neck. While a metal chain comprised of small links is preferable and illustrated in the figures, any type of cloth, plastic, fabric, or other similar material can be employed in alternate embodiments, including the use of these materials to form solid belts or bands, or chains created by smaller links composed of material other than metal.

Figure 1:
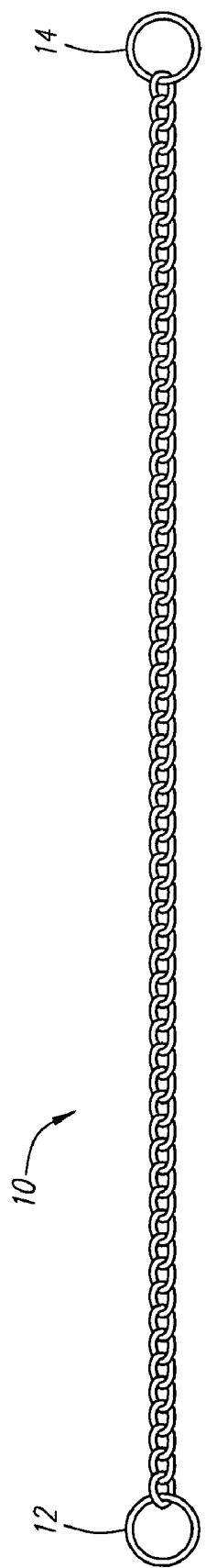
FIG. 1 is a front view of one surface of the collar.
Figure 2:
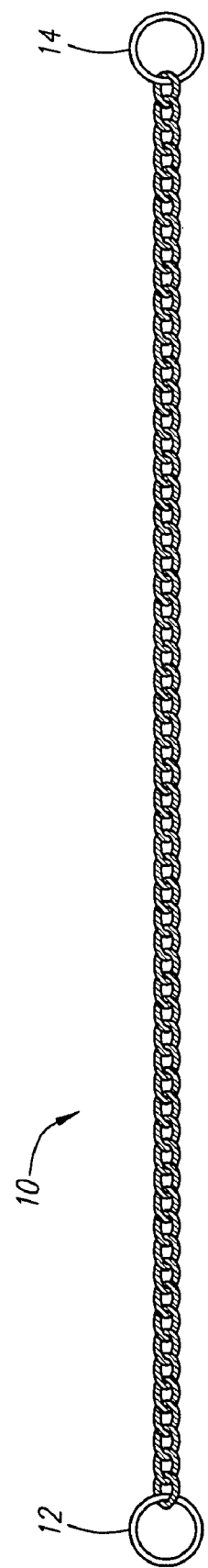
FIG. 2 is a front view of the opposing surface of the collar, with shading to denote surface differentiation (coloration) with respect to the opposing surface of the collar.

The main body 10 forms two opposing surfaces, one of which is uncolored or bare metal, and the other of which is colored. Uncolored surface 18 and colored surface 20 can be seen in FIGS. 3 and 4. FIG. 1 shows a front view of the uncolored surface 18, and FIG. 2 shows a front view of the opposing, colored surface 20. The shading in the figures represents coloration, while the unshaded regions represents uncolored parts of the chain, that is, those portions that are bare metal. While the preferred embodiment uses color to differentiate the opposing surfaces 18 and 20, those skilled in the art will appreciate any number of differentiating techniques, such as by varying the texture or surface material, as between surfaces 18 and 20.

Rings or connectors 12 and 14 are attached at each end of the band, as shown in FIGS. 1 and 2. The preferred embodiment of the connectors 12 and 14 is a rounded connector, though in alternate embodiments, the connector could be any shape sufficient to retain the main body 10 as it passes through the connector during collar operation. For example, the connector could be any non-curved shape, such as a square, rectangle, or any non-curved shape with corners. Further, the connector need not be completely enclosed, as one skilled in the art would readily recognize a partially-open connector would also be sufficient to retain main body 10.

In operation, referring to FIGS. 3 and 4, the main body 10 is passed through connector 12 to form a large loop 16. The loop 16 is sized by sliding the main body 10 through connector 12, and can be varied according to the size of the animal's neck. The loop 16 is then placed around the animal's neck, and a leash can be attached to connector 14. While the figures illustrate passing the main body 10 through connector 12 with a leash attachment point at connector 14, it is understood that the user could equally pass the main body 10 through connector 14 to form a loop, and the leash could then equally be attached to connector 12. It is also understood that the main body 10 could be long enough such that no leash or leash connector is necessary.

Upon placing the loop 16 about the animal's neck, the user can quickly and easily determine the proper orientation of the collar. Referring to FIG. 3, which shows the collar in the correct and proper orientation with the non-slideable portion of main body 10 hanging down from connector 12, the colored surface 20 faces upwardly, in the direction of the user, for that portion of the main body 10 that passes through connector 12 and attaches to connector 14. In addition, all outwardly-facing portions of loop 16 are also comprised of colored surface 20. Thus, the colored surface 20 is upwardly visible and contiguous, moving left from connector 14 across FIG. 3, all the way around the outwardly-facing portions of loop 16. Contiguity in the visible portions of the collar as the user looks down at the collar during use indicates to the user that the collar is properly position. When the collar is placed around the animal's neck in this manner, a rapid release of collar tension about the animal's neck results, with little or no manual adjustment of tension by the user.

On the other hand, referring to FIG. 4, an improper collar orientation is shown. In FIG. 4, the non-slideable portion of main body 10 does not hang down from connector 12. Rather, connector 12 hangs essentially down from the non-slideable portion of main body 10. In this orientation, the collar will tend to remain in a locked position upon application of leash tension. The user can readily detect that the collar is not properly oriented. This is because there is no contiguity of the upwardly-visible collar surfaces. That is, uncolored surface 18 is upwardly visible on that portion of the main body 10 that passes through connector 12 and attaches to connector 14, while colored surface 20 is upwardly visible on all other visible portions of the collar, i.e. all outwardly-facing portions of loop 16. Lack of contiguity in visible coloration as the user looks down at the collar during use permits ease of detection of improper collar orientation, and the user can thus apply the collar in the proper orientation.

While contiguity in coloration has been illustrated in FIG. 3 to denote proper color orientation, it is understood that such use of color, as opposed to non-color (i.e. bare metal) to determine continuity, is arbitrary. Thus, those skilled in the art will appreciate that the colored/non-colored sides could be reversed in an alternate embodiment, and the collar could nonetheless operate to denote proper orientation by continuity in non-color (i.e. bare metal), or continuity in any other type of surface differentiation, such as texture or surface material differentiation.

Although a particular embodiment of the invention has been described and illustrated herein in detail, it is recognized that modifications may readily occur to those skilled in the art. Consequently, it is intended that the claims herein be interpreted to cover any such modifications. It is further intended that the present invention be not limited according to the disclosed embodiment, but rather only according to the appended claims.

What is claimed is:

1. In a method of using a coded animal collar about an animal's neck, said collar comprising an elongated flexible material suitable for placement around an animal's neck, said elongated flexible material having a first end and a second end, and a first surface and a second surface, said first surface and said second surface defined as surfaces extending from said first end to said second end, and said first surface being located on a side opposing said second surface, a first connector pivotally attached to said first end of said elongated flexible material, said first connector suitable for permitting said elongated flexible material to pass therethrough allowing formation of a loop, and said first surface being visually differentiated from said second surface, wherein said first surface having at least one of different color, different texture, or different material that is different from that of said second surface, the method comprising:

first, passing said elongated flexible material through said first connector to form a loop;

second, placing said loop around the animal's neck thereby forming an upwardly facing portion of said loop, wherein said upwardly facing portion of said loop having at least one of said first or said second surfaces, and pulling said second end to change the tightness of said loop around the animal's neck thereby forming an upwardly facing portion of said elongated flexible material from the point where said elongated flexible material passes through said first connector to the point of said second end of said elongated flexible material, wherein said upwardly facing portion of said elongated flexible material having at least one of said first or said second surfaces; and third orienting said loop about the animal's neck and such that at least one of the first and second surfaces of the upwardly facing portion of said loop is substantially visually identical to at least one of the first and second surfaces of the upwardly facing portion of said elongated flexible material, and such that said first end of said elongated flexible material emanates from said first connector.

2. The animal collar according to claim 1 wherein the third step comprises orienting said loop about the animal's neck such that at least one of the first and second surfaces of the upwardly facing portion of said loop is not substantially visually identical to at least one of the first and second surfaces of the upwardly facing portion of said elongated flexible material, and such that said first connector emanates from said first end of said elongated flexible material.

3. The animal collar according to claim 1 wherein a second connector is pivotally attached to said second end of said elongated flexible material.

4. The animal collar according to claim 3 wherein said first connector and said second connector are circles.

* * * * *